US012672005B2

(12) United States Patent
Chami et al.

(10) Patent No.: US 12,672,005 B2
(45) Date of Patent: Jun. 30, 2026

(54) RESOURCE MANAGEMENT PLATFORM AND A METHOD OF MANAGING NETWORK LOAD

(71) Applicant: Vodafone Group Services Limited, Newbury (GB)

(72) Inventors: Youssef Chami, London (GB); Liam Beard, London (GB); Paul Rosbotham, London (GB)

(73) Assignee: Vodafone Group Services Limited, Newbury (GB)

( * ) Notice: Subject to any disclaimer, the term of this patent is extended or adjusted under 35 U.S.C. 154(b) by 359 days.

(21) Appl. No.: 18/323,371

(22) Filed: May 24, 2023

(65) Prior Publication Data
US 2023/0388810 A1 Nov. 30, 2023

(30) Foreign Application Priority Data
May 27, 2022 (GB) .................................... 2207879

(51) Int. Cl.
*H04W 16/14* (2009.01)
*H04W 28/02* (2009.01)

(52) U.S. Cl.
CPC ....... *H04W 16/14* (2013.01); *H04W 28/0289* (2013.01)

(58) Field of Classification Search
None
See application file for complete search history.

(56) References Cited

U.S. PATENT DOCUMENTS 7,583,971 B2 * 9/2009 Gorsuch ................. H04J 13/18
370/335
2008/0075178 A1 * 3/2008 Lappetelainen ..... H04B 7/2606
455/7
(Continued)

FOREIGN PATENT DOCUMENTS

AU 2016203689 6/2016
CN 103561409 2/2014
(Continued)

OTHER PUBLICATIONS

Search Report for EP application No. 23175701 dated Oct. 5, 2023.
(Continued)

*Primary Examiner* — Willie J Daniel, Jr.
(74) *Attorney, Agent, or Firm* — Workman Nydegger

(57) ABSTRACT

A resource management platform for managing network load in a first telecommunications network operated by a first mobile network operator is provided. The resource management platform is configured to receive, from the first mobile network operator, a request for radio resources; send, to a second mobile network operator, a request to allocate radio resources to the first mobile network operator; receive, from the second mobile network operator, configuration data for allocating radio resources to the first mobile network operator, wherein the radio resources are provided by a second telecommunications network operated by the second mobile network operator; and send the configuration data to the first mobile network operator, wherein the configuration data enables the first mobile network operator to increase available network capacity in the first telecommunications network.

18 Claims, 6 Drawing Sheets

(56) References Cited

U.S. PATENT DOCUMENTS

| | | | |
|---|---|---|---|
| 2008/0219213 A1 | 9/2008 | Natarajan et al. | |
| 2013/0203435 A1* | 8/2013 | Smith | H04W 16/14 |
| | | | 455/454 |
| 2015/0319658 A1 | 11/2015 | Padden et al. | |
| 2016/0119793 A1 | 4/2016 | Tudose | |
| 2018/0103379 A1 | 4/2018 | Smith et al. | |
| 2019/0357264 A1* | 11/2019 | Yi | H04L 5/0023 |
| 2022/0132320 A1 | 4/2022 | Bye et al. | |

FOREIGN PATENT DOCUMENTS

| | | |
|---|---|---|
| CN | 106941675 | 7/2017 |
| EP | 2974429 | 11/2018 |
| WO | 2013/170045 | 11/2013 |
| WO | WO2014098963 | 6/2014 |

OTHER PUBLICATIONS

Search Report for GB application No. 2207879.4 dated Nov. 15, 2022.

* cited by examiner

RESOURCE MANAGEMENT PLATFORM AND A METHOD OF MANAGING NETWORK LOAD

FIELD OF THE INVENTION

The present invention relates to a resource management platform for managing network load in a telecommunications network operated by a mobile network operator. More specifically, the invention relates to management platforms methods for improving network capacity and coverage in the telecommunications network by sharing radio resources between mobile network operators.

BACKGROUND

Radio spectrum resources are essential for telecommunications networks and are restricted to allocated specific frequency ranges and frequency bands within those ranges. Allocation of these radio resources is done on a per-operator basis. However, only a sub-set of the spectrum bands licensed to each Mobile Network Operator (MNO) are actually deployed at individual base station sites. This may be due to the high cost of deployment or high ongoing operating costs. This may result in underused spectrum assets, wasted hardware and poorer coverage and capacity availability in the network.

EP2974429 describes system for managing and monitoring allocation of RF spectrum resources based on time, space and frequency. A network may be enabled to allocate excess spectrum resources for use by other network providers on a real-time basis. Allocated resources may be transferred from one provider with excess resources to another in need of additional resources based on contractual terms or on a real-time purchase negotiations and settlements. A network may be enabled to monitor the use of allocated resources on real-time basis and off-load or allow additional users depending on the spectrum resources availability.

WO2014098963 describes a cloud spectrum management system.

CN103561409 describes a spectrum leasing method in a hierarchical cellular network.

US2016119793 describes shared use of licensed frequency spectrum in a mobile communications network, while maintaining confidentiality between the license holder and the licensee.

CN106941675 describes a method and system for allocating spectrum resources.

The methods in the prior art are described generally as Multi-operator Radio Access Networks (MORAN) and Multi-operator Core Networks (MOON). These are documented in 3GPP standards. Some methods of MORAN/MOON described in the prior art implement direct communication between network operators for negotiating resource allocation. However, these negotiation schemes are not well defined, may be more prone to errors and do not provide much flexibility (for example, adding a third MNO to the sharing scheme would be difficult). The present invention aims to address these issues with the prior art.

SUMMARY

Against this background, the present invention provides a resource management platform (which may be a server) for managing network load in a first telecommunications network operated by a first mobile network operator. The resource management platform is configured to:

receive, from the first mobile network operator, a request for radio resources;

send, to a second mobile network operator, a request to allocate radio resources to the first mobile network operator;

receive, from the second mobile network operator, configuration data for allocating radio resources to the first mobile network operator, wherein the radio resources are provided by a second telecommunications network operated by the second mobile network operator; and send the configuration data to the first mobile network operator, wherein the configuration data enables the first mobile network operator to increase available network capacity in the first telecommunications network.

In contrast to prior art systems, the present invention provides a resource management platform, which mediates between the first and second mobile network operators (and optionally third and further MNOs). By providing an external platform to manage the available resources of the MNOs, the present invention enables MNOs that require additional radio resources to make use of unused radio resources in different MNOs in an efficient manner. As a result, the platform enables different mobile network operators to share resources in order to a) manage network capacity and b) improve coverage. The resource management platform (also called the "orchestration platform") may implement an API, which different mobile network operators can use to request additional network capacity from other MNOs.

The resource management platform may be further configured to determine, based on the request, the second mobile network operator as a suitable mobile network operator from a plurality of mobile network operators.

The request for radio resources may comprise one or more of:

an indication of a geographic area in which additional radio resources are requested;

a particular radio access technology for which additional radio resources are requested;

an indication of a level of additional coverage for which the additional radio resources are requested (such as a bandwidth requirement for the additional coverage); and an indication that the additional radio resources are requested until they are released by the first mobile network operator or a specified period of time for which the additional radio resources are requested.

The indication of the level of additional coverage for which the additional radio resources are requested may comprise one or more of:

an indication of the bandwidth required; and an indication of a maximum latency requirement.

The indication of the level of additional coverage may further comprise an indication loss/error rate requirements.

The resource management platform may be further configured to send, in response to receipt of the request for radio resources, an acknowledgement of the request (and the geographic area, radio access technology, level of additional coverage and/or period of time) to the first mobile network operator.

The resource management platform may be further configured to:

receive, from the first mobile network operator, a request to release ("deallocate", "relinquish" or "return") some or all of the radio resources allocated to the first mobile network operator by the second mobile network operator; and send, to the second mobile network operator, a request to release some or all of the radio resources allocated to the first mobile network operator.

The resource management platform may be further configured to:

receive, from the second mobile network operator, a request to release ("deallocate", "relinquish" or "return") some or all of the radio resources allocated to the first mobile network operator by the second mobile network operator; and send, to the first mobile network operator, a request to release some or all of the radio resources allocated to the first mobile network operator.

The resource management platform may be further configured to:

receive, from the first mobile network operator, a request for additional radio resources;

send, to the second mobile network operator, a request to allocate additional radio resources to the first mobile network operator;

receive, from the second mobile network operator, further configuration data for allocating additional radio resources to the first mobile network operator, wherein the additional radio resources are provided by the second telecommunications network; and send the further configuration data to the first mobile network operator.

The additional radio resources may comprise a dedicated bandwidth or slice of radio resources (which may have a specific Quality of service profile, as agreed by the first and second mobile operators). The further configuration data may enable the first mobile network operator to utilise the dedicated bandwidth or slice of radio resources in the first telecommunications network.

The further configuration data may comprise traffic offload data that enables the first mobile network operator to offload data traffic from the first telecommunications network via the additional radio resources or via already deployed radio resources.

The additional radio resources may comprise WiFi hotspot resources. In other words, the configuration data may enable the first mobile network operator to increase available network capacity in the first telecommunications network by allocating WiFi hotspot resources provided by a second mobile network operator to the first mobile network.

A method of managing network load in a first telecommunications network operated by a first mobile network operator is also provided. The method comprises:

receiving, at a resource management platform, a request for radio resources from the first mobile network operator;

sending, to a second mobile network operator, a request to allocate radio resources to the first mobile network operator;

receiving, from the second mobile network operator, configuration data for allocating radio resources provided by a second mobile network operator to the first mobile network operator; and sending the configuration data to the first mobile network operator.

The method may further comprise:

sending, to a third mobile network operator, a request to allocate radio resources to the first mobile network operator;

receiving, from the third mobile network operator, an indication that the third mobile network operator is unable to allocate radio resources to the first mobile network operator; or receiving, from the third mobile network operator, configuration data for allocating radio resources provided by the third mobile network operator to the first mobile network operator, wherein the radio resources are provided by a third telecommunications network operated by the third mobile network operator, and sending the configuration data to the first operator to:

increase available network capacity in the first telecommunications network, utilise a portion of the bandwidth or slice of allocated radio resources in the first telecommunications network; and/or offload data traffic from the first telecommunications network via the allocated radio resources.

A method of managing network load in a first telecommunications network operated by a first mobile network operator is also provided. The method comprises:

determining, by the first mobile network operator, that a network load (or a proportion of used network capacity) of the first telecommunications network (or of a particular RAT or base station of the telecommunications network) is greater than a threshold;

sending, to a resource management platform, a request for radio resources;

receiving, from the resource management platform, configuration data for allocating radio resources to the first mobile network operator, wherein the radio resources are provided by a second telecommunications network operated by a second mobile network operator; and using the configuration data to increase available network capacity in the first telecommunications network (for the particular RAT or base station).

Determining that the network load is greater than a threshold may comprise determining that a proportion of utilised capacity at a base station of the first telecommunications network is greater than a threshold proportion.

Determining that the network load is greater than a threshold may comprise determining that a proportion of utilised capacity of a particular radio access technology (at a base station of the telecommunications network) is greater than a threshold proportion.

For example, if utilisation of the 4G radio resources of a base station of the first telecommunications network is greater than a threshold, the first mobile network operator may request additional radio resources from the resource management platform. The additional radio resources may be 4G radio resources provided by the second MNO or may be radio resources of a different RAT of the second MNO.

The method may further comprise providing network configuration data (which may comprise network IDs), to subscribers of the first telecommunications network, wherein the network configuration data enables the subscribers to access services provided by the first mobile network operator (e.g. call services, data services etc.) via the radio resources provided by the second telecommunications network.

The method may further comprise:

determining, by the first mobile network operator, that a network load of the first telecommunications network is greater than a second threshold (the network load may be measured in the same way as before or may be measured differently. The load may take the previously allocated resources into account);

sending, to the resource management platform, a request for additional radio resources;

receiving, from the resource management platform, further configuration data for allocating additional radio resources to the first mobile network operator, wherein the additional radio resources are provided by the second telecommunications network operated by the second mobile network operator, wherein the additional radio resources comprise a dedicated bandwidth or slice of radio resources; and using the further configuration data to utilise the dedicated bandwidth or slice of radio resources in the first telecommunications network.

The method may further comprise:

determining, by the first mobile network operator, that a network load of the first telecommunications network is greater than a third threshold (the network load may be measured in the same way as before or may be measured differently. The load may take the previously allocated resources into account);

sending, to the resource management platform, a request for third additional radio resources;

receiving, from the resource management platform, third configuration data for allocating third additional radio resources to the first mobile network operator, wherein the third additional radio resources are provided by the second telecommunications network operated by the second mobile network operator, wherein the third configuration data comprises traffic offload data using the third configuration data to offload data traffic from the first telecommunications network via the third additional radio resources.

The method may further comprise:

determining, by the first mobile network operator, that a network load of the first telecommunications network is less than a fourth threshold;

sending, to the resource management platform, a request to a request to release some or all of the radio resources allocated to the first mobile network operator by the second mobile network operator.

Computer software is also provided. The computer software, when executed by a processor, causes the processor to perform a method as described above.

BRIEF DESCRIPTION OF THE DRAWINGS

The present invention will now be described with reference a number of non-limiting specific examples, which are illustrated in the following Figures.

DETAILED DESCRIPTION

5G Networks incorporate a number of features that allow network operators to enhance the services that they provide to their customers, as compared to earlier network standards. Moreover, enhancements may be made to operator networks to ensure that standards set by regulatory bodies are met. For example, some governmental agencies require that network operators deliver potential coverage gain, and a flexible service environment. At the same time, network operators must meet their own objectives, which may include offering services and additional capacity/coverage at the lowest possible cost.

The architecture and standard features and capability provided by 5G, which are designed to offer commercial services, requires additional enhancements in order to facilitate collaboration between operators and/or service providers. More specifically, tight interworking between key network elements and functions, e.g. OSS, Orchestrations, and Multi-Edge Computing (MEC) must be supported.

It is an object of the proposed system to:

allow operator(s) to more fully utilise their available spectrum resources;

allow operators' partners to make use of the available spectrum by allowing it to be deployed on their active radio equipment; and support the regulatory programs to re-use spectrum in a such a way as to become more efficient over the longer term, this is due to limited spectrum resources and the massive increase in data traffic.

Advantages that are brought about by aspects of the proposed system include:

reduced hardware and operational requirements (which may in turn bring down costs to address pressures on operational network budgets);

enhancements to available services (for example, to provide integrated broadband services to meet user needs);

improved flexibility (to better match and be responsive to user demand); and improved efficiency (operators will be able to optimise their spectrum use).

In order to achieve these above objectives, the present application proposes enhancements to the Network Architecture topology. In particular, the present invention provides a resource management platform to manage requests for radio resources between mobile network operators.

Figure 1A:
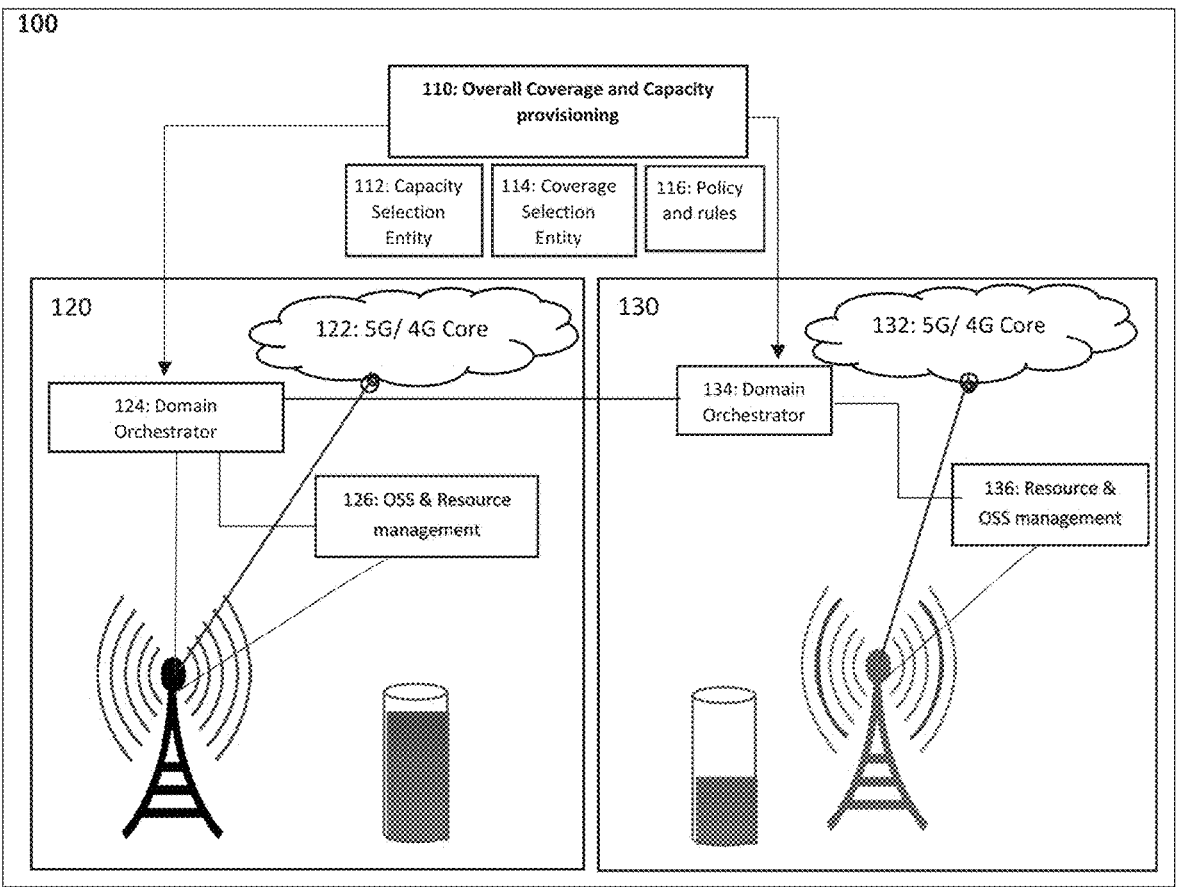
FIG. 1A illustrates a system 100 comprising a resource management platform 110 according to a specific example of the present invention.

FIG. 1A illustrates a system 100 comprising a resource management platform 110 according to a specific example of the present invention. The resource management platform 110 is configured to manage radio resources of a first telecommunications network 120 and a second telecommunications network 130. The resource management platform 110 may also be called an "Overall Coverage and Capacity provisioning" platform. The resource management platform 110 may comprise a Capacity Selection Entity 112, a Coverage Selection Entity 114, and a Policy and rules store 116.

The resource management platform 110 could be hosted by any of the network operators (e.g. the first or second network operator) or by a third party or regulatory body, to manage and control the resources of the networks.

The first telecommunications network 120 may comprise a Core 122 (core network), a Domain Orchestrator 124 and an OSS & Resource management entity 126.

Likewise, the second telecommunications network 130 may comprise a Core 132, a Domain Orchestrator 134 and an OSS & Resource management entity 136.

The Core 122 and 132 may be a 5G or 4G core in some specific examples.

The domain orchestrator of each telecommunications network may be responsible for managing the radio resources of the network, ensuring that services are provided according to a service level agreement (SLA) and negotiating borrowing and release of radio resources from other networks.

As illustrated in FIG. 1A, there may be times when the first telecommunications network 120 is operating with a high load and the second telecommunications network 130 is operating with a medium load. This may occur, for example, during the busy hour when load on the first telecommunications network is expected to peak. To handle the high load, the first network operator requests radio resources from the resource management platform 110. The resource management platform 110 sends a request to the second mobile network operator to allocate radio resources from the second telecommunications network 130 to the first telecommunications network 120.

Figure 1B:
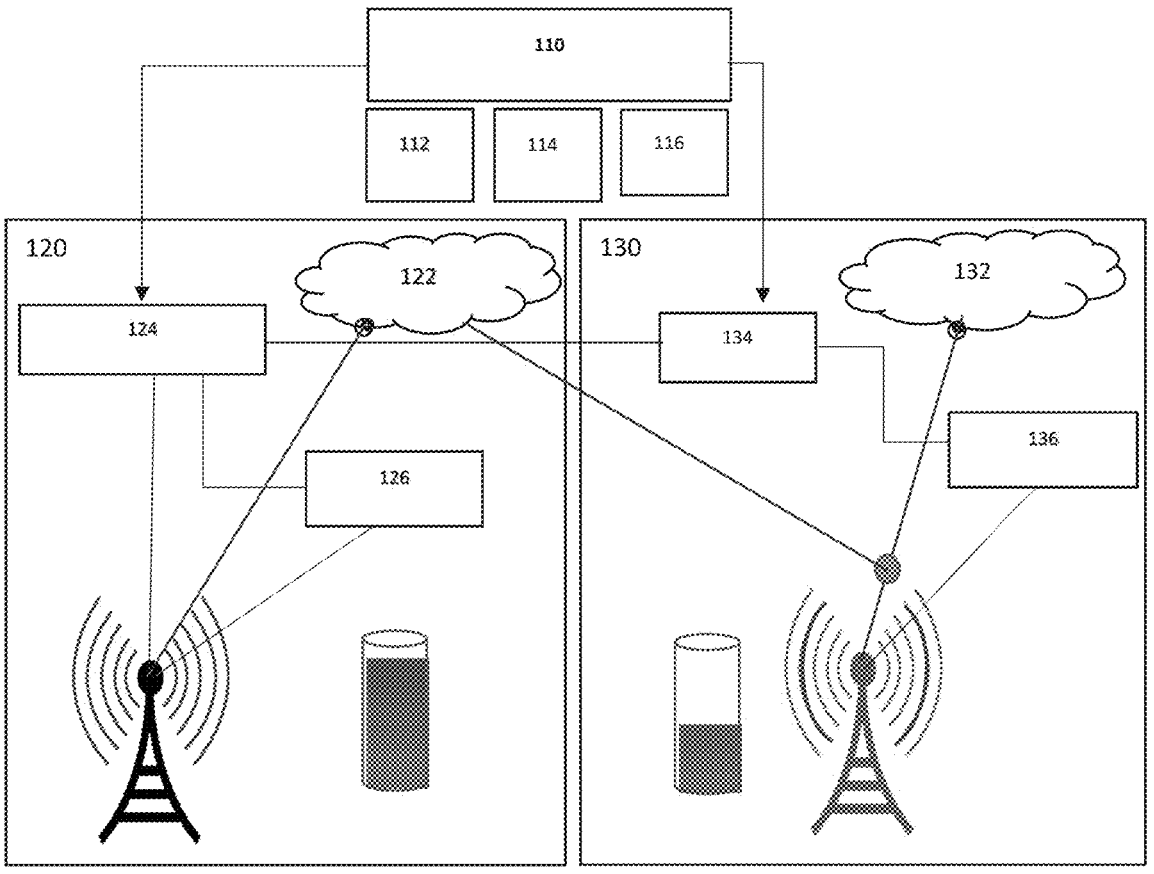
FIG. 1B illustrates allocation of resources in the system 100.

As illustrated in FIG. 1B, if the request is accepted, the second mobile network operator allocates radio resources to the first telecommunications network 120 and sends a message to the resource management platform 110 comprising configuration data. The resource management platform sends the configuration data to the first mobile network operator, which uses the configuration data to increase available network capacity in the first telecommunications network 120.

The configuration data allows the first telecommunications network 120 to receive communications into the 5G/4G core received via the radio hardware of the second telecommunications network.

The allocated radio resources may be, for example, 10% of a slice. This allocation may be static (i.e. it stays the same until it is released) or may be dynamic (i.e. the proportion of the slice that is allocated may be adjusted depending on the needs of the first network and the availability of resources in the second network).

To ensure that the core of the first telecommunications network is able to cope with the additional capacity provided by radio spectrum resources of the second telecommunications network, the first mobile network operator must ensure that the bandwidth of the backhaul part of the core network is adequate.

By providing a resource management platform 110 that is able to mediate between mobile network providers in this way, the present invention is able to facilitate operators providing network as a platform (NaaP) services. This may result in a system that is much more efficient and flexible overall.

Through implementation of the proposed methods and systems, MNOs can make more efficient use their own Radio and Transmission assets that they have deployed, in order to realise service level, commercial and operational benefits, for example:

Capacity enhancement for the Host: An Operator should be able to enhance utilisation of their own asset(s) by activating spectrum that is owned by alternative operators, to improve their own network capacity or performance. A Host could also "lease" their own spectrum or bandwidth or a particular slice(s) from their already deployed spectrum/transmission resources.

Coverage improvement: An Operator should have the ability to activate shared spectrum from an alternative operator, or lease a slice within the alternative MNO host's own spectrum, on a site-by-site or region-by-region basis, in order to enhance their coverage with the shared spectrum or reduce the operational cost in quiet times e.g. 11 pm to 5 am.

One example of where the proposed methods can help to accommodate temporary increases in load is if there is a power outage. Such an outage can induce many smart meters in the affected area to send messages to energy suppliers via a mobile network. This may affect one mobile network more than others, depending on the deals that mobile networks have with energy suppliers. To accommodate for this increase in demand, the affected network may borrow radio resources from an unaffected network.

In another example, a first network may have poor coverage in a particular geographic area, which is well-served by another network. Rather than building new infrastructure, the first network may lease resources from other network providers, to fill in gaps in their coverage.

In another example, a first network may require capacity for a particular radio access technology (RAT), which is not implemented by the first network but is implemented by another network. For example, the first network may not provide 2G coverage but may lease resources from other network providers in order to provide 2G coverage on a temporary or ongoing basis.

Figure 2A:
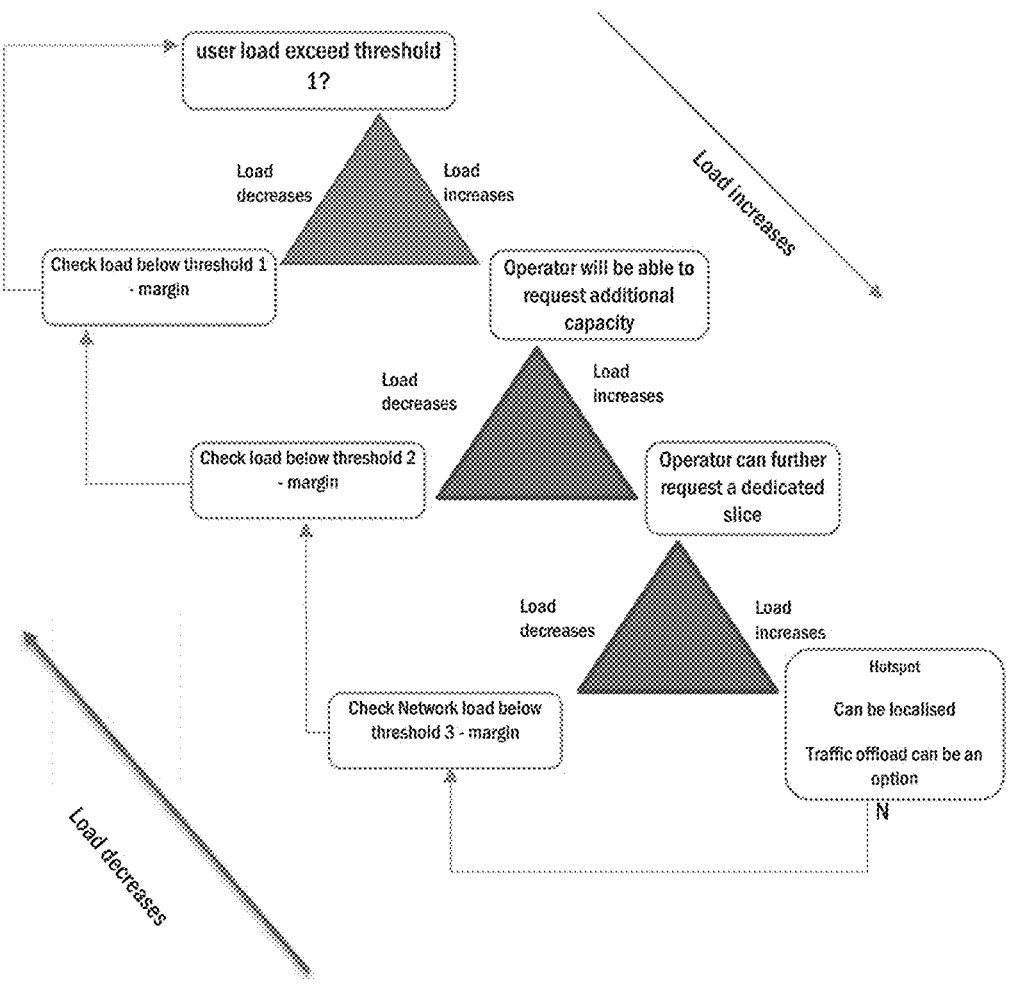
FIG. 2A illustrates how mobile networks with limited resources may react to changes in load over time.

FIG. 2A illustrates how mobile networks with limited resources may react to changes in load over time. As the load on the network increases, the operator may request additional capacity. Capacity can be added by A) activating more radio spectrum on their own hardware, or B) by using radio spectrum on another partner MNO's site.

Figure 2B:
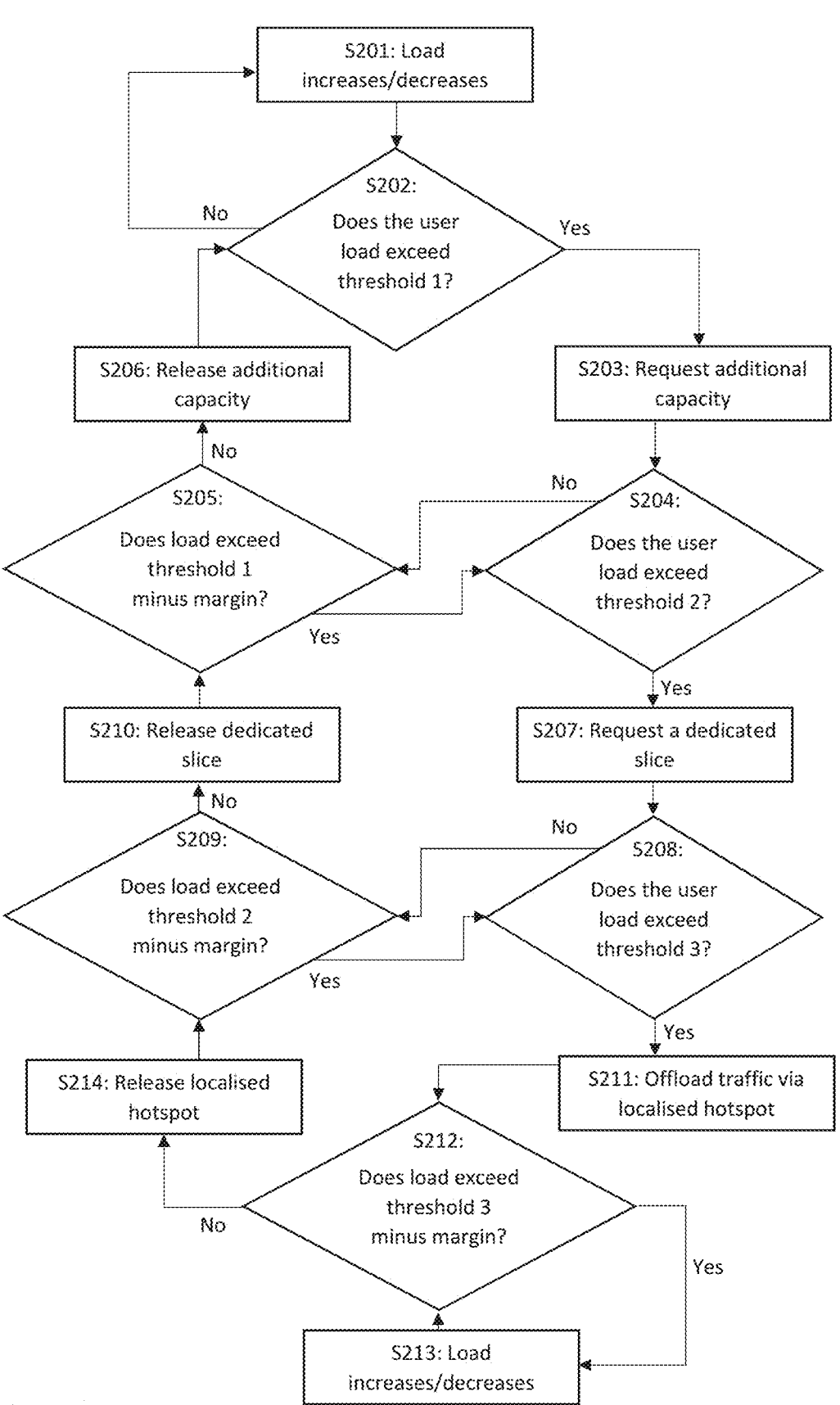
FIG. 2B illustrates a flow diagram of how a specific example system transitions between states as the load increases and decreases, in order to implement the proposed methods.

FIG. 2B illustrates a flow diagram of how a specific example system transitions between states as the load increases and decreases, in order to implement the proposed methods.

Initially, the network may be operating within capacity and with the user load below a first threshold. Since the load is below the threshold, there is no requirement for additional resources and no additional capacity is requested. The load on the network may increase and decrease over time and this is monitored by the system.

If the load increases above threshold 1, the network requests additional capacity. Additional capacity may be provided by another network, which may allocate a proportion of a slice to the network.

If the load decreases again and then goes below threshold 1 by at least a margin amount then the additional capacity may be released.

The margin provides hysteresis in the system and prevents small fluctuations around the threshold from causing the system to oscillate between allocating and releasing resources.

If the load increases above threshold 2, the network requests a dedicated slice. If the load decreases again and then goes below threshold 2 by at least a margin amount then the dedicated slice may be released (although the network may retain a proportion of a slice if the load remains above threshold 1 minus the margin).

If the load increases above threshold 3, the network requests traffic offload via a localised hotspot. If the load decreases again and then goes below threshold 3 by at least a margin amount then the localised hotspot may be released (although the network may retain a dedicated slice if the load remains above threshold 2 minus the margin).

Figure 3:
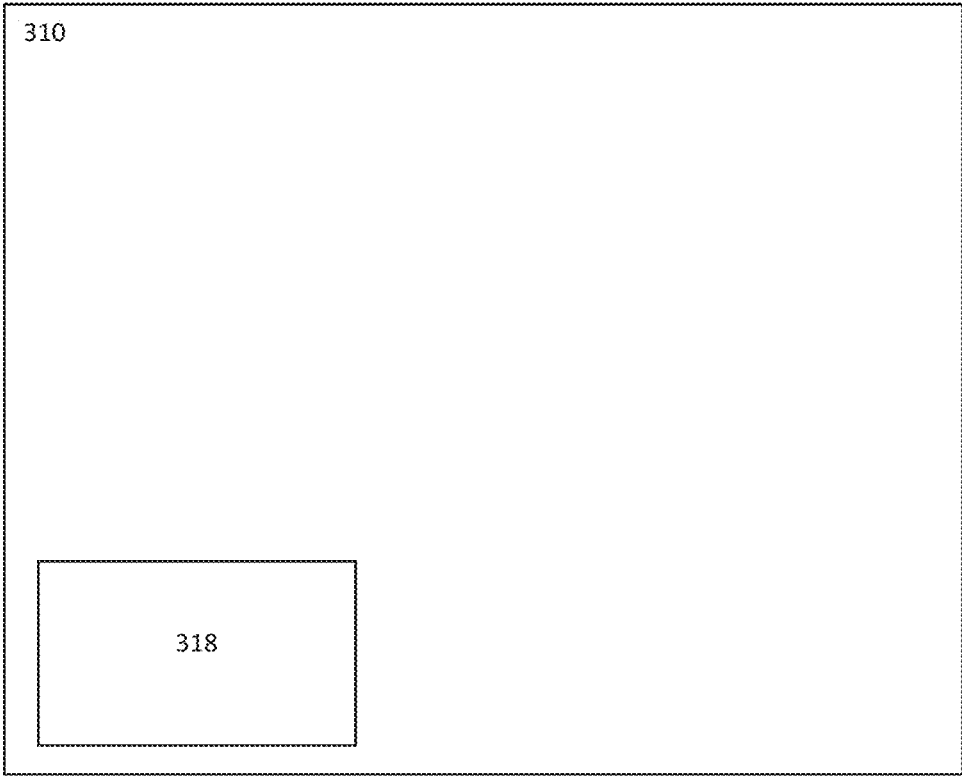
FIG. 3 illustrates a resource management platform according to a specific example.

FIG. 3 illustrates a resource management platform 310 for managing network load in a first telecommunications network operated by a first mobile network operator according to a specific example. The resource management platform 310 is configured to:

receive, from the first mobile network operator, a request for radio resources;

send, to a second mobile network operator, a request to allocate radio resources to the first mobile network operator;

receive, from the second mobile network operator, configuration data for allocating radio resources to the first mobile network operator, wherein the radio resources are provided by a second telecommunications network operated by the second mobile network operator; and send the configuration data to the first mobile network operator, wherein the configuration data enables the first mobile network operator to increase available network capacity in the first telecommunications network.

The resource management platform 310 is configured to send and receive requests and messages to and from the first and second mobile network operators via a transceiver or interface 318. The resource management platform 310 may implement an API for MNOs to manage radio resources via the resource management platform.

Figure 4:
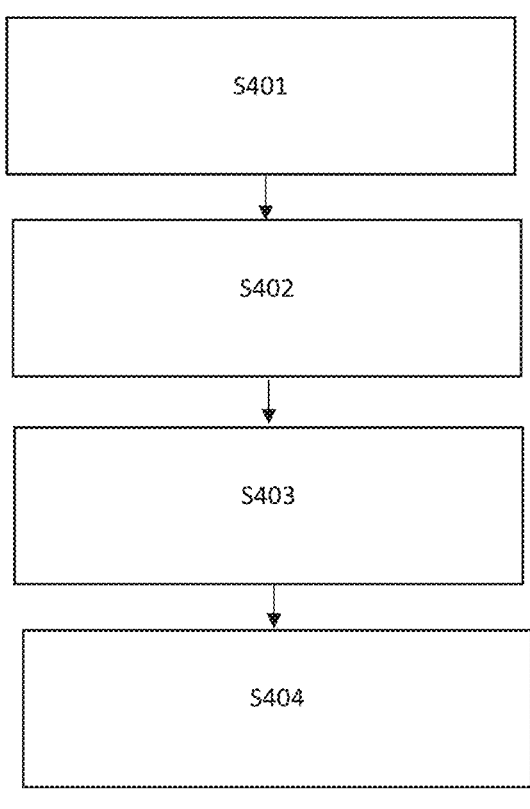
FIG. 4 illustrates a method of managing network load according to a specific example.

FIG. 4 illustrates a method of managing network load in a first telecommunications network operated by a first mobile network operator according to a specific example. The method comprises the steps of:

S401: receiving, at a resource management platform, a request for radio resources from the first mobile network operator;

S402: sending, to a second mobile network operator, a request to allocate radio resources to the first mobile network operator;

S403: receiving, from the second mobile network operator, configuration data for allocating radio resources provided by a second mobile network operator to the first mobile network operator; and S404: sending the configuration data to the first mobile network operator.

Figure 5:
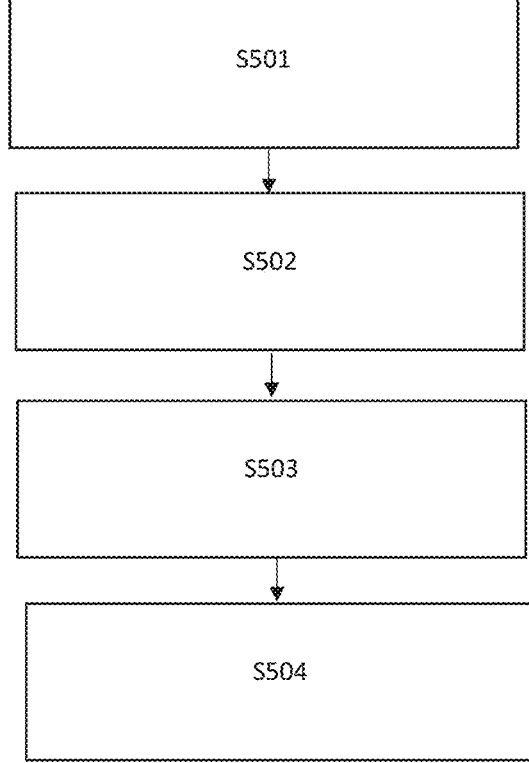
FIG. 5 illustrates a method of managing network load according to another specific example.

FIG. 5 illustrates a method of managing network load in a first telecommunications network operated by a first mobile network operator according to a specific example. The method comprises the steps of:

S501: determining, by the first mobile network operator, that a network load of the first telecommunications network is greater than a threshold;

S502: sending, to a resource management platform, a request for radio resources;

S503: receiving, from the resource management platform, configuration data for allocating radio resources to the first mobile network operator, wherein the radio resources are provided by a second telecommunications network operated by a second mobile network operator; and S504: using the configuration data to increase available network capacity in the first telecommunications network.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an analogue to digital convertor) means "one or more" (for instance, one or more analogue to digital convertor). Throughout the description and claims of this disclosure, the words "comprise", "including", "having" and "contain" and variations of the words, for example "comprising" and "comprises" or similar, mean "including but not limited to", and are not intended to (and do not) exclude other components.

Although embodiments according to the disclosure have been described with reference to particular types of devices and applications (particularly a resource management platform managing requests from mobile network operators) and the embodiments have particular advantages in such case, as discussed herein, approaches according to the disclosure may be applied to other types of networks. The specific structural details of the platform and servers, whilst potentially advantageous (especially in view of known 3GPP constraints and capabilities), may be varied significantly to arrive at devices and methods with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the aspects and/or features disclosed in this specification may be combined in any combination, except combinations where at least some of such features and/or steps are mutually exclusive. As described herein, there may be particular combinations of aspects that are of further benefit, such the aspects of determining a set of compensation parameters and applying a set of compensation parameters to measurements. In particular, the preferred features of the invention are applicable to all aspects of the invention and may be used in any combination. Likewise, features described in non-essential combinations may be used separately (not in combination).

The invention claimed is:

1. A resource management platform for managing network load in a first telecommunications network operated by a first mobile network operator, wherein the resource management platform is configured to:

receive, from the first mobile network operator, a request for radio resources, wherein the request for radio resources comprises a particular radio access technology for which additional radio resources are requested;

send, to a second mobile network operator, a request to allocate radio resources to the first mobile network operator;

receive, from the second mobile network operator, configuration data for allocating radio resources to the first mobile network operator, wherein the radio resources are provided by a second telecommunications network operated by the second mobile network operator for the particular radio access technology; and send the configuration data to the first mobile network operator, wherein the configuration data enables the first mobile network operator to increase available network capacity in the first telecommunications network for the particular radio access technology based on a margin amount, wherein the margin amount provides hysteresis to the second mobile network operator and prevents fluctuations around a threshold from causing the second mobile network operator to oscillate between allocating and releasing the radio resources.

2. The resource management platform of claim 1, wherein the resource management platform is further configured to determine, based on the request, the second mobile network operator as a suitable mobile network operator from a plurality of mobile network operators.

3. The resource management platform of claim 1, wherein the request for radio resources comprises one or more of:

an indication of a geographic area in which additional radio resources are requested;

a particular radio access technology for which additional radio resources are requested;

an indication of a level of additional coverage for which the additional radio resources are requested; and an indication that the additional radio resources are requested until they are released by the first mobile network operator or a specified period of time for which the additional radio resources are requested.

4. The resource management platform of claim 3, wherein the indication of the level of additional coverage for which the additional radio resources are requested comprises one or more of:

an indication of a bandwidth required; and an indication of a maximum latency requirement.

5. The resource management platform of claim 3, wherein the resource management platform is further configured to send, in response to receipt of the request for radio resources, an acknowledgement of the request to the first mobile network operator.

6. The resource management platform of claim 1, wherein the resource management platform is further configured to:

receive, from the first mobile network operator, a request to release some or all of the radio resources allocated to the first mobile network operator by the second mobile network operator; and send, to the second mobile network operator, a request to release some or all of the radio resources allocated to the first mobile network operator.

7. The resource management platform of claim 1, wherein the resource management platform is further configured to:

receive, from the first mobile network operator, a request for additional radio resources;

send, to the second mobile network operator, a request to allocate additional radio resources to the first mobile network operator;

receive, from the second mobile network operator, further configuration data for allocating additional radio resources to the first mobile network operator, wherein the additional radio resources are provided by the second telecommunications network; and send the further configuration data to the first mobile network operator.

8. The resource management platform of claim 7, wherein the additional radio resources comprise a dedicated bandwidth or slice of radio resources, wherein the further configuration data enables the first mobile network operator to utilise the dedicated bandwidth or slice of radio resources in the first telecommunications network.

9. The resource management platform of claim 7, wherein the further configuration data comprises traffic offload data that enables the first mobile network operator to offload data traffic from the first telecommunications network via the additional radio resources or via already deployed radio resources.

10. The resource management platform of claim 9, wherein the additional radio resources comprise WiFi hotspot resources.

11. A method of managing network load in a first telecommunications network operated by a first mobile network operator, the method comprising:

receiving, at a resource management platform, a request for radio resources from the first mobile network operator, wherein the request for radio resources comprises a particular radio access technology for which additional radio resources are requested;

sending, to a second mobile network operator, a request to allocate radio resources to the first mobile network operator;

receiving, from the second mobile network operator, configuration data for allocating radio resources provided by the second mobile network operator to the first mobile network operator; and sending the configuration data to the first mobile network operator, wherein the configuration data enables the first mobile network operator to increase available network capacity in the first telecommunications network for the particular radio access technology based on a margin amount, wherein the margin amount provides hysteresis to the second mobile network operator and prevents fluctuations around a threshold from causing the second mobile network operator to oscillate between allocating and releasing the radio resources.

12. The method of claim 11, further comprising:

sending, to a third mobile network operator, a request to allocate radio resources to the first mobile network operator;

receiving, from the third mobile network operator, an indication that the third mobile network operator is unable to allocate radio resources to the first mobile network operator; or receiving, from the third mobile network operator, configuration data for allocating radio resources provided by the third mobile network operator to the first mobile network operator, wherein the radio resources are provided by a third telecommunications network operated by the third mobile network operator, and sending the configuration data to the first mobile network operator, wherein the configuration data enables the first mobile network operator to:

increase available network capacity in the first telecommunications network, utilise a portion of a bandwidth or slice of allocated radio resources in the first telecommunications network; and/or offload data traffic from the first telecommunications network via the allocated radio resources.

13. A method of managing network load in a first telecommunications network operated by a first mobile network operator, the method comprising:

determining, by the first mobile network operator, that a network load of the first telecommunications network is greater than a threshold;

sending, to a resource management platform, a request for radio resources, wherein the request for radio resources comprises a particular radio access technology for which additional radio resources are requested;

receiving, from the resource management platform, configuration data for allocating radio resources to the first mobile network operator, wherein the radio resources are provided by a second telecommunications network operated by a second mobile network operator for the particular radio access technology; and using the configuration data to increase available network capacity in the first telecommunications network for the particular radio access technology based on a margin amount, wherein the margin amount provides hysteresis to the second telecommunications network and prevents fluctuations around the threshold from causing the second telecommunications network to oscillate between allocating and releasing the radio resources.

14. The method of claim 13, wherein determining that the network load is greater than a threshold comprises determining that a proportion of utilised capacity at a base station of the first telecommunications network is greater than a threshold proportion.

15. The method of claim 13, wherein determining that the network load is greater than a threshold comprises determining that a proportion of utilised capacity of a particular radio access technology is greater than a threshold proportion.

16. The method of claim 13, further comprising providing network configuration data, to subscribers of the first telecommunications network, wherein the network configuration data enables the subscribers to access services provided by the first mobile network operator via the radio resources provided by the second telecommunications network.

17. The method of claim 13, further comprising:

determining, by the first mobile network operator, that a network load of the first telecommunications network is greater than a second threshold;

sending, to the resource management platform, a request for additional radio resources;

receiving, from the resource management platform, further configuration data for allocating additional radio resources to the first mobile network operator, wherein the additional radio resources are provided by the second telecommunications network operated by the second mobile network operator, wherein the additional radio resources comprise a dedicated bandwidth or slice of radio resources; and using the further configuration data to utilise the dedicated bandwidth or slice of radio resources in the first telecommunications network.

18. The method of claim 17, further comprising:

determining, by the first mobile network operator, that a network load of the first telecommunications network is greater than a third threshold;

sending, to the resource management platform, a request for third additional radio resources;

receiving, from the resource management platform, third configuration data for allocating third additional radio resources to the first mobile network operator, wherein the third additional radio resources are provided by the second telecommunications network operated by the second mobile network operator, wherein the third configuration data comprises traffic offload data; and using the third configuration data to offload data traffic from the first telecommunications network via the third additional radio resources.

* * * * *